Feb. 29, 1944.   S. G. SAUNDERS ET AL   2,342,758
WINDOW
Filed Nov. 24, 1941
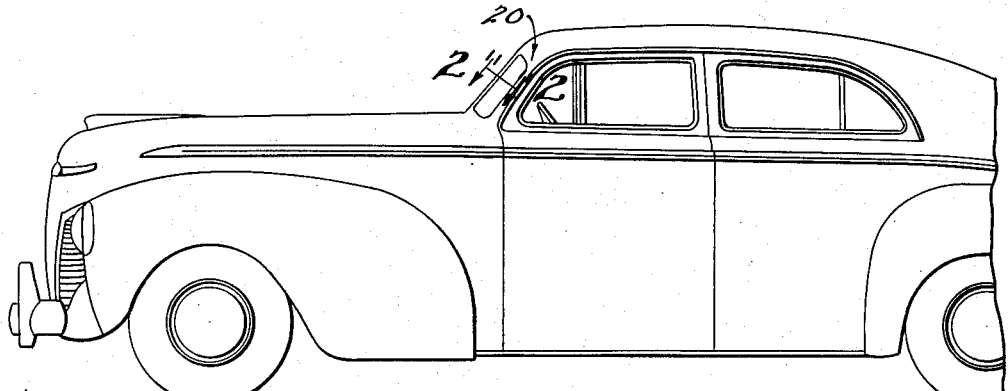
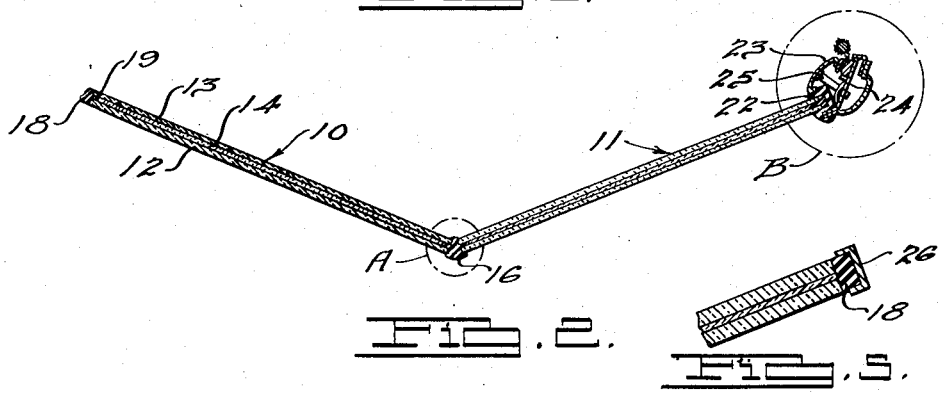
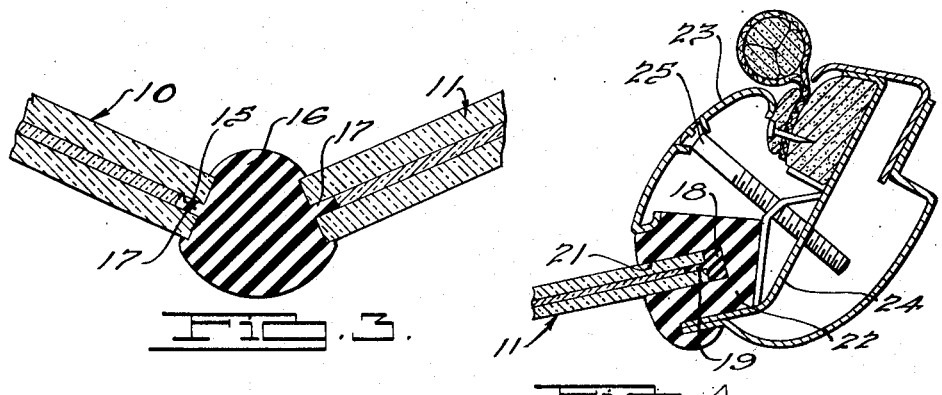
INVENTORS.
Seymour G. Saunders,
Harry Morrison.
BY
ATTORNEYS.

Patented Feb. 29, 1944

2,342,758

UNITED STATES PATENT OFFICE 2,342,758

WINDOW

Seymour G. Saunders, Bloomfield Hills, and Harry Morrison, Detroit, Mich., assignors to Chrysler Corporation, Highland Park, Mich., a corporation of Delaware Application November 24, 1941, Serial No. 420,154

4 Claims. (Cl. 296—84)

This invention relates to an improved window structure.

More particularly, the invention pertains to improved window structures such as vehicle windshields and the like which have angularly disposed transparent panes connected in edge to edge relationship.

One of the main objects of the invention is the provision of a structurally bonded, non-metallic, resilient binding strip between adjacent edges of glass panes and between the edges thereof and a supporting frame of a window or windshield assembly which forms an integral seal against wind, rain and weather.

Another object of the invention is the provision of an improved mounting in a structure of this kind which is particularly adapted for securing the edge portions of laminated safety glass together and to a supporting frame.

A further object of the invention is the provision of yieldable mounting elements between the joined edges of the glass panes and between the outer edges thereof and the surrounding frame work which are permanently structurally bonded to the glass and adapted to permit sufficient movement of the glass panes to accommodate convenient fitting thereof in a rigid supporting structure.

An additional object of the invention is the provision in devices of this kind of rubber mounting and connecting elements which are so rigidly bonded to the glass pane portions of the device as to satisfy the structural strength requirements thereof without the assistance of metallic or other rigid members of the character that have heretofore been required to clampingly or otherwise mechanically connect together adjacent glass panes and mount the same in surrounding frame work.

A still further object of the invention is to provide an improved V-shaped vehicle windshield having converging sections secured together in abutting relationship by adhesion of a narrow rubber strip thereto which does not materially obstruct vision through the windshield.

An illustrative embodiment of the invention is shown in the accompanying drawing, in which:

Fig. 1 is a side elevational view of a vehicle having a windshield embodying the invention.

Fig. 2 is a fragmentary sectional view taken on the line 2—2 of Fig. 1.

Fig. 3 is an elongated sectional view of the structure within the circle A of Fig. 2.

Fig. 4 is an enlarged sectional view of the structure within the circle B of Fig. 2.

Fig. 5 is a fragmentary sectional view of an assembly of a window embodying the invention in a window frame of different construction than that shown in Figs. 1, 2 and 4.

In the form of the invention illustrated in the drawing the improved window, in the form of a vehicle windshield, comprises two glass panes generally designated by the numerals 10 and 11 which are disposed in angularly converging planes with their adjacent edges in closely spaced relationship. The glass panes 10 and 11 are of the safety glass construction in that they each comprise laminations 12 and 13 bonded together by an intermediate transparent resin layer 14 in accordance with conventional practice. It is preferred to terminate the intermediate bonding layer 14 slightly within the edges of the glass panes 10 and 11, as illustrated in Figs. 2 and 3 and 4 in order to provide a substantially continuous groove 15 about the perimeter thereof.

The adjacent edges of the glass panes 10 and 11 are connected together in a rain, wind and weather proof manner by a rubber strip 16 of generally tapering cross section and relatively narrow maximum width. Tongues 17 protrude in respectively opposite directions from the opposite sides of the rubber strip 16 and extend in closely fitting relationship into the sections of the groove 15 in the adjacent edges of the glass panes.

The remaining edge portions of the glass panes 10 and 11 may, if desired, be surrounded by strips of rubber 18 having flanges 19 which extend into the corresponding portions of the groove 15 in order to facilitate mounting of the glass panes in the rigid frame work generally designated by the numeral 20 of the vehicle in which the windshield is disposed. The rubber strips 18 may, however, be omitted if desired and the panes be mounted in the windshield frame in accordance with conventional practice in vehicle construction.

The contacting surfaces of the rubber strip 16 including the surfaces of the flanges 17 thereof are integrally bonded to the surfaces of the glass panes with which they contact and the extremities of the flanges 17 are integrally structurally bonded to the edge of the intermediate transparent layer 14 against which it bears. This bond is definitely of a structural nature and is preferably formed in accordance with the teachings of our copending application, Serial No. 354,230, filed August 26, 1940, by cyclizing the surfaces of the rubber which are to be bonded to the window panes by treatment of the rubber with sulphuric or other suitable acid and applying thereto an adhesive of the class set forth in the above mentioned application which preferably comprises a mixture of phenol formaldehyde and modified polyvinyl acetate resins. Modified polyvinyl acetate resin in solution in suitable solvents is available on the market under this nomenclature. It is a hydrolized polyvinyl acetate having a complex chain of interlinked molecules. The structure of the modified polymer may be pictured as a long chain, the alternate links of which are vinyl alcohol and vinyl acetate units:

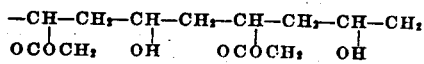

In general, the actual distribution of the alcohol and ester components in the chain depends on the chance hydrolysis of the ester group.

The parts of the structure are assembled together in the foregoing manner so as to hold the surfaces of the rubber strips and glass panes to be bonded under moderate pressure contact and the assembly is then heated in an air circulated oven for approximately one hour at a temperature of from approximately 250° F. to 275° F.

After the foregoing heating operation, the cement becomes set producing bonds of from 600 to 1000 pounds per square inch strength between the glass and the rubber elements.

In mounting the assembled windshield panes in a vehicle of substantially conventional construction, the outer perimeter of the windshield may be received in grooves 21 of a rubber strip 22 surrounding the windshield in a manner substantially identical to that in which conventional windshields are mounted in vehicles of conventional construction. In a structure of this kind, the rubber strip 22 is clamped by a molding plate 23 in a recess provided by a sheet metal structure 24 surrounding the windshield opening. The molding 23 is held in place by spaced bolts 25.

When our improved windshield is provided with outer marginal strips of rubber 18 which are bonded structurally to the edge of the window pane, the latter rubber strips may be relied upon to directly yieldably secure the window pane in a rigid frame structure 26, as shown in Fig. 5, and to provide an effective seal against rain, wind and weather around the marginal portions of the window panes. In this illustration of the invention, the flange 19 and groove 15 are omitted and the rubber strip 18 is bonded by adhesion directly to the aligned edges of the glass planes 10 and 11 and the intermediate resin bonding layer 14. If desired, this planular surface to surface adhesion of the glass and rubber strip may be employed in the structure shown in Figs. 1 to 4, inclusive, in order to avoid the necessity of the provision of a flange on the rubber strip and a groove in the pane.

The relatively narrow rib-like strip 16 of rubber by which the panes 10 and 11 are secured together obstructs but little of the driver's view and because it is yieldable, it accommodates that relative movement of the window panes 10 and 11 which is required to fit the window panes in their respective positions in a structure which is conventionally held to close tolerances.

Although but two specific embodiments of the invention are herein shown and described, it is to be understood that various changes in the size, shape and arrangement of parts may be made without departing from the spirit of the invention.

We claim:

1. A vehicle windshield comprising a pair of converging glass panes having slightly spaced adjacent edges, each of said panes including a pair of sheets of glass and an intermediate bonding layer terminating inwardly of said adjacent edges for providing grooves between said sheets, a rubber strip between said adjacent edges having an integral flange extending into the groove of each of the latter, and a film of adhesive material integrally bonded to contacting surfaces of said rubber strip and glass panes.

2. A vehicle windshield comprising a pair of converging glass panes having slightly spaced adjacent edges, each of said panes including a pair of sheets of glass and an intermediate bonding layer terminating inwardly of the edges for providing grooves between said sheets, a rubber strip between said adjacent edges having an integral flange extending into the groove of each of the latter, and a film of adhesive material integrally bonded to contacting surfaces of said rubber strip and glass panes, and rubber strips disposed adjacent the outer edges of said panes each having a flange seated in the associated groove, and adhesive material integrally bonded to contacting surface portions of said latter rubber strips and said panes.

3. A window comprising a frame structure, a glass pane comprising a pair of sheets of glass and an intermediate bonding layer, said bonding layer terminating inwardly of the edges of said glass pane for providing grooves therein, strips of non-metallic material bounding the edges of said pane each having a flange extending into a groove of one of said edges, and a film of adhesive material integrally bonded with surfaces of said strip and surfaces of said glass sheets and intermediate bonding layer, said glass pane being mounted in said frame by attachment of said non-metallic strips thereto.

4. A window comprising a glass pane including a pair of sheets of glass and an intermediate bonding layer, said bonding layer terminating inwardly of the edges of said pane for providing grooves therein, bounding elements on the edges of said pane comprising longitudinally extending flanges extending into said grooves and having body portions on respectively opposite sides of said flanges for abutting the edges of said sheets of glass adjacent said grooves, and a film of adhesive integrally bonded to surfaces of said flange and body portions of said bounding elements and to adjacent surfaces of said glass sheets and intermediate bonding layer.

SEYMOUR G. SAUNDERS.
HARRY MORRISON.